3,411,581
LOST CIRCULATION SLURRIES
Smith Alpha, Berwick, La., assignor to Silver Lining, Inc., Morgan City, La., a corporation of Louisiana
No Drawing. Filed Mar. 21, 1966, Ser. No. 535,686
7 Claims. (Cl. 166—29)

ABSTRACT OF THE DISCLOSURE

A high water loss slurry for forming a cake to plug fractures in formations in which bore holes are being drilled and circulation has been lost which is essentially an aqueous dispersion of ground oyster shells in a suspending medium.

---

This invention relates to improvements in slurries used in oil well drilling operations and it relates particularly to slurries for treating wells in which the circulation of drilling mud has been lost because of fractures in the formations through which the bore hole is being drilled.

It has been proposed, heretofore, to provide so-called lost circulation slurries by means of which fractures in the formations can be plugged to permit drilling of the hole to proceed with the proper circulation of the drilling mud therein without excessive losses. Lost circulation slurries are described in The Oil and Gas Journal of Apr. 1, 1963, under the title, "How Atlantic Squeezes With High-Water-Loss Slurry." The lost circulation slurry or slurries disclosed therein contain barites as a basic plugging component supplemented by other components such as ground nut shells, animal and vegetable fibers, a filter aid, a suspending agent which will not greatly reduce the water loss or separation of the solids from the water under pressure and other components which will control the suspension of the solids in water. This slurry when introduced into the bore hole deposits a mat of fibers over the fracture and the barite acts as a filler which is built up into a cake which is forced under the applied pressure into the fracture. Pressure exerted on the cake compresses the formation around the fracture and prevents further fracturing except under much higher pressures than those which caused the initial fracture or fractures.

A problem encountered in the provision of suitable lost circulation slurries is to obtain a proper density of the slurry without settling and without reducing the water loss from the slurry. In many instances, the slurries are too dense to handle properly without reduction of the suspending agent to the extent that the filler, such as barites, will settle out of the slurry.

In accordance with the present invention, a lost circulation material is provided which is capable of building up a plugging cake of greater thickness in a shorter period of time than is possible with the slurries containing barite and which does not require the addition of such materials as ground nut shells to impart strength to the cake.

More particularly, in accordance with the present invention, I have found that ground oyster shell of about 20 to 30 mesh size and of the type generally known in the industry as "Laminex," manufactured by Laminar Corporation, Berwick, Louisiana, or "Laminar 5," manufactured by the same company, provides the required shear strength while maintaining a high water loss characteristic and enabling the production of suitable slurries weighing as little as 10 pounds per gallon. Such low density slurries are particularly useful in hard rock areas where high slurry weights are seldom needed. Slurries of the type embodying the present invention have been found to be capable of depositing a cake ⅝ of an inch thick in thirty seconds on a fracture, thereby effectively plugging the fracture. For example, a slurry capable of producing such a plugging action may consist of 0.85 barrel of water, 70 pounds of ground oyster shell of 20 to 30 mesh, 4 cubic feet of "Diacel D" (filter aid), 6½ pounds of attapulgite clay and 10 pounds of salt. The components of the composition have specific functions in the production of the slurry. Thus, the attapulgite clay (salt gel), is a suspending agent providing just enough gel strength to suspend the larger ground oyster shell particles without drastically reducing the fluid or water loss. Salt is included to prevent any bentonite which may contaminate the slurry from swelling and reducing the fluid loss of the slurry.

As indicated above, "Diacel D" is a filter aid which increases the fluid loss. The ground oyster shell increases the shear strength of the filter cake. If desired, fibrous material, such as animal hair or vegetable fibers, can be included in the slurry in order to form a screen on the face of the fracture and initiate the cake-forming action by filtering out the coarser granular material which makes up the bulk of the filter cake and provides the required shear strength. It has been found that about 20 to 30 mesh oyster shell added in the amount of about ½ cubic foot per barrel gives the best increase in shear strength. Finer particles do not materially increase the shear strength but may serve to produce a more solid and firmer filter cake.

The following tables illustrate the advantages of the use of ground oyster shell of 20 to 30 mesh size over barite which has been used in the lost circulation slurries heretofore provided.

TABLE I

[Diacel D Attapulgite Barites Slurry*]

| Water, bbl. | Salt,[1] lb. | Clay,[2] lb. | Diacel D, ft.[3] | Barites, lb. | Slurry Wt., lb./gal. | Cake [3] Thickness, in. | Fluid Loss, sec./50 cc. |
|---|---|---|---|---|---|---|---|
| 67 | 1,006 | 378 | 331 | 14,500 | 12 | 22/32 | 31 |
| 63.6 | 995 | 336 | 294 | 18,100 | 13 | 24/32 | 33 |
| 57.2 | 858 | 249 | 216 | 26,300 | 15 | 29/32 | 35 |
| 54.2 | 813 | 205 | 176 | 31,100 | 16 | 27/32 | 42 |
| 48.3 | 726 | 109 | 94 | 41,200 | 18 | 30/32 | 55 |
| 45.6 | 685 | 56 | 52.5 | 46,600 | 19 | 28/32 | 65 |

For footnotes see end of Table II.

TABLE II

[Diacel D Attapulgite Laminex Slurry*]

| Water, bbl. | Salt,[1] lb. | Clay,[2] lb. | Diacel D, ft.[3] | 20-30 mesh ground oyster shell, lb. | Slurry Wt., lb./gal. | Cake[3] Thickness, in. | Fluid Loss, sec./50 cc. |
|---|---|---|---|---|---|---|---|
| 67   | 1,006 | 378 | 331  | 8,200  | 11.0 | 24/32 | 3 |
| 63.6 | 955   | 336 | 294  | 10,220 | 11.2 | 25/32 | 32 |
| 57.2 | 858   | 249 | 216  | 14,800 | 11.6 | 31/32 | 37 |
| 54.2 | 813   | 205 | 176  | 17,500 | 12.0 | 32/32 | 45 |
| 48.3 | 726   | 109 | 94   | 23,200 | 12.8 | 30/32 | 60 |
| 45.6 | 685   | 56  | 52.5 | 26,300 | 12.9 | 30/32 | 85 |

*Recipe is for 80 barrels of slurry.
[1] Salt is sodium chloride.
[2] Clay is attapulgite (salt gel).
[3] Cake thickness measured after thirty seconds of fluid loss at 100 p.s.i.

It will be apparent from the preceding tables that lost circulation slurries containing ground oyster shell and having a lower density than slurries containing barites, nevertheless provide a greater cake thickness than the higher density barite slurries. This results in a considerable savings of material in the slurry without loss of the stability of the slurry and with about the same fluid loss rate as with the denser barite slurry. Moreover, with the oyster shell slurry, it is unnecessary to add other materials for increasing shear strength, such as ground nut shells, and this in turn improves the rate of fluid loss for the reason that the nut shells absorb and retain water while the oyster shell does not.

The addition of fibrous materials to both the barites and the oyster shell lost circulation slurries enhances the formation of the screen over the fracture for separating the solids in the lost circulation slurry and hence facilitates the plugging and compression of the fracture.

It will be apparent from the foregoing that the new lost circulation slurry and the components thereof provide an improved means for overcoming circulating loss and enabling the handling of the material in the preparation of the slurries without settling out and loss of the solid components thereof. With the new lost circulation slurry, the components can be packaged together and mixed with the requisite amount of water in a simple mixing apparatus. For example, the components may be mixed to produce two mixtures, one for preparing a slurry of 11 pound per gallon density and the other for preparing a 12.8 pound per gallon density and these can be used in equal proportions, for example, to make an 11.6 pound per gallon mixture, or any density in the range between 11 pounds and 12.8 pounds per gallon. In many instances, the use of a low density slurry is most advantageous, particularly in hard rock fractures, and such densities can be achieved utilizing ground oyster shell as the shear strength providing element because it will not settle out of the slurry at these low densities.

It will be understood that the new slurries are susceptible to variation in their densities, in the inclusion or exclusion of fibrous materials, and other modifications in proportions and components can be made without departing from the invention. Accordingly, the examples of the invention given above should be considered as illustrative and the invention should not be considered as limited except as defined in the following claims.

I claim:

1. A high water loss slurry for forming a cake to plug fractures in formations in which bore holes are being drilled and circulation has been lost, said slurry being essentially an aqueous dispersion of a density of at least 10 pounds per gallon comprising water, ground oyster shell of about 20 to 30 mesh size, a medium for suspending the ground oyster shell in the aqueous dispersion, and a filter aid ingredient.

2. A slurry as set forth in claim 1 consisting essentially of between about 8200 and 26,300 pounds of said oyster shell, about 56 to 378 pounds of said suspending medium, about 52.5 to 331 cubic feet of said filter aid, about 685 to 1006 pounds of sodium chloride and about 67 to 45.6 barrels of water in proportions to produce a slurry weighing between about 10.0 and 13 pounds per gallon.

3. A high water loss slurry for forming a cake to plug fractures in formations in which bore holes are being drilled and circulation has been lost, said slurry being essentially an aqueous dispersion of a density of at least 10 pounds per gallon comprising water, ground oyster shell of about 20 to 30 mesh size, a medium for suspending the ground oyster shell in the aqueous dispersion, and fibrous material for initiating cake formation at a fracture.

4. A high water loss slurry for forming a cake to plug fractures in formations in which bore holes are being drilled and circulation has been lost, said slurry being essentially an aqueous dispersion of a density of at least 10 pounds per gallon comprising water, ground oyster shell of about 20 to 30 mesh size, and attapulgite clay for suspending the ground oyster shell in the aqueous dispersion.

5. A method of plugging fractures in formations traversed by a bore hole comprising introducing into said bore hole in the area containing said fracture a high water loss slurry which is essentially an aqueous dispersion comprising ground oyster shell of about 20 to 30 mesh size, a suspending medium, water in an amount to provide a slurry weight of at least 10 pounds per gallon and a filter aid, and applying pressure to said slurry to displace water into said fracture and deposit a cake containing said oyster shell at said fracture.

6. A method of plugging fractures in formations traversed by a bore hole comprising introducing into said bore hole in the area containing said fracture a high water loss slurry which is essentially an aqueous dispersion comprising ground oyster shell of about 20 to 30 mesh size, water in an amount to provide a slurry weight of at least 10 pounds per gallon and attapulgite clay in an amount to suspend said ground oyster shell in said water, and applying pressure to said slurry to displace water into said fracture and deposit a cake containing said oyster shell at said fracture.

7. A method of plugging fractures in formations traversed by a bore hole comprising introducing into said bore hole in the area containing said fracture a high water loss slurry which is essentially an aqueous dispersion comprising ground oyster shell of about 20 to 30 mesh size, a suspending medium, water in an amount to provide a slurry weight of at least 10 pounds per gallon and fibrous material to form a screen over said fracture to aid in the formation of said cake, and applying pressure to said slurry to displace water into said fracture and deposit a cake containing said oyster shell at said fracture.

References Cited

UNITED STATES PATENTS

| | | | |
|---|---|---|---|
| 2,193,807 | 3/1940  | Dieterich | 166—29 X |
| 2,773,550 | 12/1956 | Wilson    | 166—30 X |
| 2,801,218 | 7/1957  | Menaul    | 166—42 X |
| 3,281,354 | 10/1966 | Scott     | 166—42 X |

NILE C. BYERS, Jr., *Primary Examiner.*